(12) United States Patent
Zhang et al.

(10) Patent No.: US 8,040,834 B2
(45) Date of Patent: Oct. 18, 2011

(54) WIRELESS COMMUNICATION METHOD AND APPARATUS FOR REPORTING TRAFFIC VOLUME MEASUREMENT INFORMATION TO SUPPORT ENHANCED UPLINK DATA TRANSMISSIONS

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/953,375

(22) Filed: Sep. 29, 2004

(65) Prior Publication Data

US 2005/0220049 A1 Oct. 6, 2005

Related U.S. Application Data

(60) Provisional application No. 60/557,974, filed on Mar. 31, 2004.

(51) Int. Cl.
*H04Q 7/00* (2006.01)
(52) U.S. Cl. ........................................ 370/328; 370/235
(58) Field of Classification Search .................. 370/230, 370/235, 328, 329, 338, 401, 412, 252
See application file for complete search history.

(56) References Cited

U.S. PATENT DOCUMENTS

| | | | |
|---|---|---|---|
| 6,108,316 A * | 8/2000 | Agrawal et al. | 370/311 |
| 6,111,869 A | 8/2000 | Esmailzadeh et al. | |
| 6,640,105 B1 | 10/2003 | Shin | |
| 6,768,715 B2 | 7/2004 | Hsu et al. | |
| 6,993,342 B2 | 1/2006 | Kuchibhotla et al. | |
| 7,158,504 B2 | 1/2007 | Kadaba et al. | |
| 7,215,653 B2 | 5/2007 | Kim et al. | |

(Continued)

FOREIGN PATENT DOCUMENTS

EP 0 887 948 12/1998

(Continued)

OTHER PUBLICATIONS

3GPP2 C.20003-C, "Medium Access Control (MAC) Standard for cdma2000 Spread Spectrum Systems", $3^{rd}$ Generation Partnership Project 2 "3GPP2", Version 2.0, Release C, Aug. 2004.

(Continued)

*Primary Examiner* — Ricky Ngo
*Assistant Examiner* — Christine Ng
(74) *Attorney, Agent, or Firm* — Volpe and Koenig, P.C.

(57) ABSTRACT

A wireless communication method and apparatus for reporting traffic volume measurement (TVM) information used to support enhanced uplink (EU) data transmissions between a wireless transmit/receive unit (WTRU), i.e., a mobile station, and a Node-B. After storing EU data in a buffer, the WTRU sends an initial TVM information request message to the Node-B indicating that the WTRU has EU data available to send to the Node-B. In response, the Node-B schedules one or more allowed EU data transmissions. The WTRU transmits at least a portion of the stored EU data to the Node-B via the allowed EU data transmissions. In one embodiment, the initial TVM information request message is sent by the WTRU only after the quantity of EU data stored in the buffer of the WTRU exceeds an established threshold. Otherwise, all of the stored EU data is transferred to the Node-B without requiring scheduling by the Node-B.

12 Claims, 2 Drawing Sheets

U.S. PATENT DOCUMENTS

| | | | |
|---|---|---|---|
| 7,369,501 B2 | 5/2008 | Kim et al. | |
| 7,609,635 B2 | 10/2009 | Bae et al. | |
| 2001/0036823 A1 | 11/2001 | Van Lieshout et al. | |
| 2002/0093953 A1 | 7/2002 | Naim et al. | |
| 2003/0125037 A1* | 7/2003 | Bae et al. | 455/450 |
| 2003/0232624 A1 | 12/2003 | Toskala et al. | |
| 2004/0062206 A1* | 4/2004 | Soong et al. | 370/252 |
| 2004/0100919 A1* | 5/2004 | Jang | 370/314 |
| 2004/0151143 A1 | 8/2004 | Abdesselem et al. | |
| 2004/0160919 A1* | 8/2004 | Balachandran et al. | 370/335 |
| 2004/0219919 A1 | 11/2004 | Whinnett et al. | |
| 2004/0223455 A1* | 11/2004 | Fong et al. | 370/229 |
| 2004/0228313 A1 | 11/2004 | Cheng et al. | |
| 2004/0229604 A1* | 11/2004 | Fong et al. | 455/422.1 |
| 2005/0025100 A1 | 2/2005 | Lee et al. | |
| 2005/0030953 A1* | 2/2005 | Vasudevan et al. | 370/395.4 |
| 2005/0053088 A1 | 3/2005 | Cheng et al. | |
| 2005/0207359 A1 | 9/2005 | Hwang et al. | |
| 2005/0213677 A1 | 9/2005 | Cho et al. | |
| 2006/0023629 A1 | 2/2006 | Kim et al. | |
| 2007/0064646 A1 | 3/2007 | Esteves et al. | |

FOREIGN PATENT DOCUMENTS

| | | |
|---|---|---|
| EP | 1 231 807 | 8/2002 |
| EP | 1 257 140 | 11/2002 |
| EP | 1 511 245 | 3/2005 |
| JP | 2000-341292 | 12/2000 |
| JP | 2002-247048 | 8/2002 |
| KR | 20020004645 | 1/2002 |
| WO | 2006/043782 | 4/2006 |

OTHER PUBLICATIONS

3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, Jul. 23, 2004.

3GPP TS 25.308, "Technical Specification Group Radio Access Network", $3^{rd}$ Generation Partnership Project; High Speed Downlink Packet Access (HSDPA); Overall description; Stage 2, (Release 6), Version 6.1.0 (Mar. 2004).

3GPP TS 25.308, "Technical Specification Group Radio Access Network", $3^{rd}$ Generation Partnership Project; High Speed Downlink Packet Access (HSDPA); Overall description; Stage 2, (Release 6), Version 6.2.0 (Sep. 2004).

3GPP TS 25.309, "Technical Specification Group Radio Access Network"; 3rd Generation Partnership Project; FDD Enhanced Uplink; Overall description; Stage 2 (Release 6) Version 6.0.0 (Sep. 2004).

3GPP TS 25.321, "Technical Specification Group Radio Access Network", $3^{rd}$ Generation Partnership Project; Medium Access Control (MAC) protocol specification (Release 6), Version 6.1.0 (Mar. 2004).

3GPP TS 25.321, "Technical Specification Group Radio Access Network", $3^{rd}$ Generation Partnership Project; Medium Access Control (MAC) protocol specification (Release 6), Version 6.2.0 (Jun. 2004).

3GPP TR 25.896 V1.1.0, "$3^{rd}$ Generation Partnership Project; Technical Specification Group Radio Access Network; Feasibility Study for Enhanced Uplink for UTRA FDD; (Release 6)", Nov. 2003.

3GPP, "$3^{rd}$ Generation Partnership Project; Technical Specification Group Radio Access Network; Feasibility Study for Enhanced Uplink for UTRA FDD; (Release 6)," 3GPP TR 25.896 V2.0.0 (Mar. 2004).

3GPP, "$3^{rd}$ Generation Partnership Project; Technical Specification Group Radio Access Network; Feasibility Study for Enhanced Uplink for UTRA FDD; (Release 6)," 3GPP TR 25.896 V6.0.0 (Apr. 2004).

3GPP, "$3^{rd}$ Generation Partnership Project; Technical Specification Group Radio Access Network, Medium Access Control (MAC) protocol specification (Release 1999)," 3GPP TS 25.321V3.16.0 (Sep. 2003).

3GPP, "$3^{rd}$ Generation Partnership Project; Technical Specification Group Radio Access Network, Medium Access Control (MAC) protocol specification (Release 1999)," 3GPP TS 25.321V3.17.0 (Jun. 2004).

3GPP, "$3^{rd}$ Generation Partnership Project; Technical Specification Group Radio Access Network, Medium Access Control (MAC) protocol specification (Release 4)," 3GPP TS 25.321V4.9.0 (Sep. 2003).

3GPP, "$3^{rd}$ Generation Partnership Project; Technical Specification Group Radio Access Network, Medium Access Control (MAC) protocol specification (Release 4)," 3GPP TS 25.321V4.10.0 (Jun. 2004).

3GPP, "$3^{rd}$ Generation Partnership Project; Technical Specification Group Radio Access Network, Medium Access Control (MAC) protocol specification (Release 5)," 3GPP TS 25.321V5.8.0 (Mar. 2004).

3GPP, "$3^{rd}$ Generation Partnership Project; Technical Specification Group Radio Access Network, Medium Access Control (MAC) protocol specification (Release 5)," 3GPP TS 25.321V5.9.0 (Jun. 2004).

Nokia Corporation et al., "Draft 25.331 CR for TVM for Enhanced Uplink with comments," 3GPP TSG-RAN WG2 Meeting #62bis, R2-083347, Warsaw, Poland (Jun. 30-Jul. 4, 2008).

Nokia, "Signalling Enhancement for UEs in PCH/FACH," 3GPP TSG RAN WG2 Meeting #39, R2-032396, San Diego, California (Nov. 17-21, 2003).

Nokia, "Uplink Enhancements for Dedicated Transport Channels," 3GPP TSG-RAN WG1 #28bis meeting, R1-02-1219, Espoo, Finland (Oct. 8-9, 2002).

3GPP TS 25.308, "Technical Specification Group Radio Access Network", $3^{rd}$ Generation Partnership Project; High Speed Downlink Packet Access (HSDPA); Overall description; Stage 2, (Relese 5), Version 5.4.0 (Mar. 2003).

Fujitsu, "Revised text proposal for Credit based enhanced uplink scheduling," 3GPP TSG-RAN WG1 #34, R1-031117 (Oct. 2003).

Qualcomm Europe, "Reference Node-B scheduler for EUL," TSG-RAN WG1 Meeting #35, R1-031246 (Nov. 2003).

Samsung, "TP on uplink signalling of scheduling information update," TSG-RAN WG1 Meeting #35, R1-031439 (Nov. 2003).

Samsung, "Transmission of small size pocket, " 3 GPP TSG-RAN WG1 #34, R1-030991 (Oct. 2003).

Samsung, "Uplink signalling of scheduling information," 3GPP TSG-RAN WG1 #34, R1-031056 (Oct. 2003).

3GPP, "3rd Generation Partnership Project; Technical Specification Group Radio Access Network, Medium.

3GPP, "3rd Generation Partnership Project; Technical Specification Group Radio Access Network; Physical channels and mapping of transport channels onto physical channels (FDD) (Release 99)," 3GPP TS 25.211 V3.12.0 (Sep. 2002).

3GPP, "3rd Generation Partnership Project; Technical Specification Group Radio Access Network; Physical channels and mapping of transport channels onto physical channels (FDD) (Release 4)," 3GPP TS 25.211 V4.6.0 (Sep. 2002).

3GPP, "3rd Generation Partnership Project; Technical Specification Group Radio Access Network; Physical channels and mapping of transport channels onto physical channels (FDD) (Release 5)," 3GPP TS 25.211 V5.6.0 (Sep. 2004).

3GPP, "3rd Generation Partnership Project; Technical Specification Group Radio Access Network; Physical channels and mapping of transport channels onto physical channels (FDD) (Release 6)," 3GPP TS 25.211 V6.2.0 (Sep. 2004).

* cited by examiner

WIRELESS COMMUNICATION METHOD AND APPARATUS FOR REPORTING TRAFFIC VOLUME MEASUREMENT INFORMATION TO SUPPORT ENHANCED UPLINK DATA TRANSMISSIONS

CROSS REFERENCE TO RELATED APPLICATION

This application claims priority from U.S. Provisional Patent Application Ser. No. 60/557,974, filed Mar. 31, 2004, which is incorporated by reference as if fully set forth herein.

FIELD OF INVENTION

The present invention is related to a wireless communication system including a wireless transmit/receive unit (WTRU) and a Node-B. More particularly, the present invention is related to reporting enhanced uplink (EU) traffic volume measurement (TVM) information to support EU data transmissions between the WTRU and the Node-B over a signaling channel having a limited capacity.

BACKGROUND

Methods for enhancing uplink (UL) coverage, throughput and transmission latency in a wireless communication system, such as a frequency division duplex (FDD) system, are currently being investigated in release 6 (R6) of the third generation partnership project (3GPP). Instead of scheduling and assigning uplink physical channels in a radio network controller (RNC), a Node-B (i.e., base station) controller is used such that more efficient decisions can be made and uplink radio resources can be managed on a short-term basis better than the RNC, even if the RNC retains overall control of the system. A similar approach has already been adopted in the downlink for release 5 (R5) of high speed data packet access (HSDPA) in a universal mobile telecommunications system (UMTS) for both an FDD mode and a time division duplex (TDD) mode.

In order for the Node-B to make efficient allocation decisions and prioritize between different priority flows, the Node-B must keep track of TVMs along with the associated priority. However, conventional UL signaling methods have limited capacity, and thus may not be able to accommodate the reporting of TVMs along with their associated priorities.

SUMMARY

The present invention is a wireless communication method and apparatus for reporting EU TVM information to support EU data transmissions between a WTRU, (i.e., a mobile station), and a Node-B. The apparatus may be a wireless communication system, a WTRU and/or an integrated circuit (IC). EU data is generated and stored in a buffer of the WTRU. The WTRU transmits an initial TVM information request message to the Node-B indicating that the WTRU has EU data to transfer to the Node-B. In response to receiving the initial TVM information request message, the Node-B schedules one or more allowed EU data transmissions between the WTRU and the Node-B by transmitting an EU data scheduling message to the WTRU.

The WTRU transfers all of the EU data stored in the buffer to the Node-B if the allowed EU data transmissions are sufficient to support transmission of all of the EU data stored in the buffer. Otherwise, the WTRU may transmit detailed TVM information multiplexed with at least a portion of the EU data to the Node-B.

The TVM information may indicate the quantity of the stored EU data. The detailed TVM information may indicate a quantity of buffered EU data associated with each of a plurality of traffic priority classes. The detailed TVM information may be multiplexed at a layer 2 medium access control (MAC) entity, or at a layer 3 radio resource control (RRC) or other equivalent layer 3 signaling entity.

The procedure used to transfer EU data stored in the buffer of the WTRU may be dependent upon whether or not the quantity of the EU data exceeds an established threshold. The initial TVM information request message may be transmitted to the Node-B only after the quantity of the stored EU data exceeds the established threshold. When the established threshold is not exceeded, the WTRU may transfer all of the EU data from the buffer of the WTRU to the Node-B without requiring scheduling information from the Node-B. If the established threshold is set to zero, the WTRU may transfer the stored EU data from the buffer of the WTRU to the Node-B only after receiving scheduling information from the Node-B.

BRIEF DESCRIPTION OF THE DRAWING(S)

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Hereafter, the terminology "WTRU" includes but is not limited to a user equipment (UE), mobile station, fixed or mobile subscriber unit, pager, or any other type of device capable of operating in a wireless environment.

When referred to hereafter, the terminology "Node-B" includes but is not limited to a base station, site controller, access point or any other type of interfacing device in a wireless environment.

The present invention may be further applicable to TDD, FDD, and time division synchronous code division multiple access (TD-SCDMA), as applied to UMTS, CDMA 2000 and CDMA in general, but is envisaged to be applicable to other wireless systems as well.

The features of the present invention may be incorporated into an IC or be configured in a circuit comprising a multitude of interconnecting components.

Figure 1:
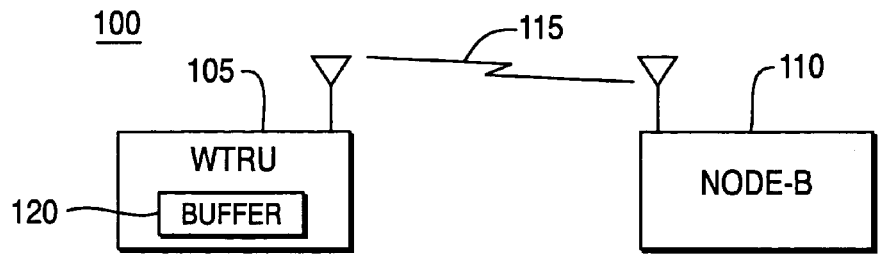
FIG. 1 shows a wireless communication system operating in accordance with the present invention.

FIG. 1 shows a wireless communication system 100 operating in accordance with the present invention. The system 100 includes a WTRU 105 and a Node-B 110 which communicate with each other via wireless signals 115. The WTRU 105 includes at least one buffer 120.

Figure 2:
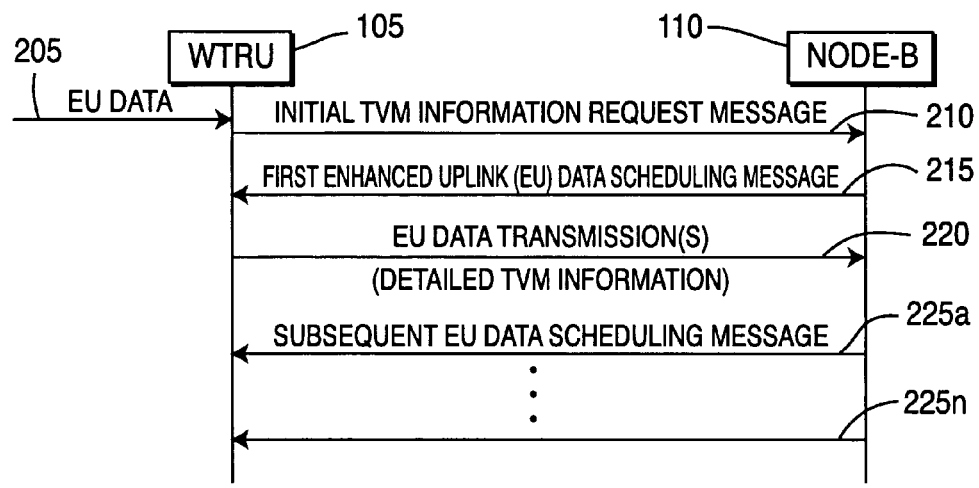
FIG. 2 is a signal flow diagram for the system of FIG. 1 when more than one EU transmission is necessary to transmit all of the EU data buffered in the WTRU.

FIG. 2 is a signal flow diagram for the wireless communication system 100 when the EU data transmissions allowed by a first EU data scheduling message are not sufficient to transmit all of the EU data stored in the buffer 120 of the WTRU 105. EU data 205 is generated at the WTRU 105 and is stored in the buffer 120 of the WTRU 105. When the quantity of the EU data in the buffer 120 exceeds an established EU data buffer threshold, the WTRU 105 sends an initial TVM information request message 210 to the Node-B 110 via an EU signaling channel. Due to the limited payload capacity of the EU signaling channel, detailed TVM information may not be included with the initial TVM information request message 210. The initial TVM information request message 210 may just indicate that the WTRU 105 has EU data ready to send, and/or may serve as a rate request to the Node-B 110 by including an approximation of the amount of EU data.

Referring still to FIG. 2, upon receiving the initial TVM information request message 210, the Node-B 110 schedules one or more EU transmissions between the WTRU 105 and the Node-B 110 via a first EU data scheduling message 215. In response to receiving the first EU data scheduling message 215, the WTRU 105 sends one or more EU data transmissions 220 to the Node-B 110 allowed by the first EU data scheduling message 215. If the EU data transmissions scheduled by the Node-B 110 are not sufficient to transmit all of the EU data buffered in the WTRU 105, the WTRU 105 sends EU data transmissions 220 including detailed TVM information that indicates the approximate amount of data buffered in the WTRU 105. Optionally, the detailed TVM information may indicate an amount of buffered data associated with each associated traffic priority class or logical channel mapped to the EU dedicated channel (EU-DCH). The detailed TVM information may be multiplexed at layer 2 or layer 3 with the EU data. At layer 2, the detailed TVM information may be identified in the EU-DCH MAC header, and at layer 3 the detailed TVM information may be signaled within a radio resource control (RRC) or other equivalent L3 signaling entity. The EU data transmissions 220 may include several independent physical transmissions.

Node-B 110 can utilize the comprehensive knowledge of the TVM information and potentially associated priorities and/or logical channels reported via the EU data transmissions 220 in subsequent uplink scheduling. When the WTRU 105 obtains additional EU data later on, the WTRU 105 may choose to report updated TVM information to the Node-B 110. The Node-B 110 then schedules subsequent EU data transmissions from the WTRU 105 to the Node-B 110 via subsequent EU data scheduling messages 225a-225n.

Figure 3:
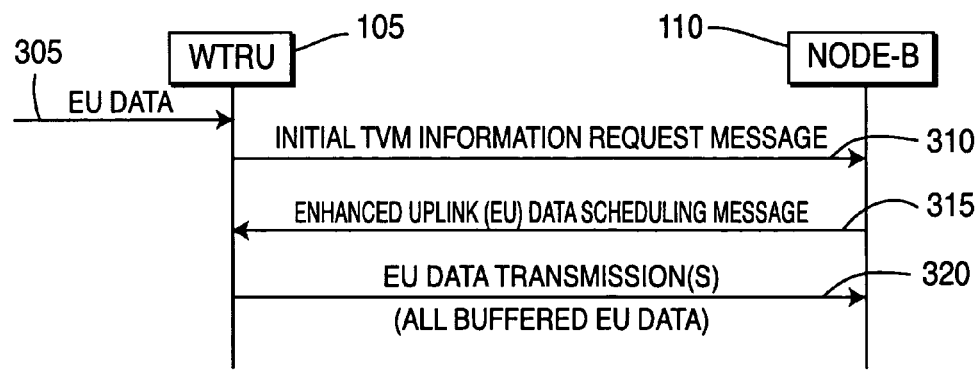
FIG. 3 is a signal flow diagram for the system of FIG. 1 when only one EU transmission is necessary to transmit all of the EU data buffered in the WTRU.

FIG. 3 is a signal flow diagram for the wireless communication system 100 when one or more EU data transmissions allowed by an EU data scheduling message are sufficient to transmit all of the EU data stored in the buffer 120 in the WTRU 105. EU data 305 is generated at the WTRU 105 and is stored in the buffer 120 of the WTRU 105. When the quantity of the EU data in the buffer 120 exceeds an established EU data buffer threshold, the WTRU 105 sends an initial TVM information request message 310 to the Node-B 110 via an EU signaling channel.

EU data transmissions sent by the WTRU 105 are not required to be scheduled by the Node-B 110 when the established EU data buffer threshold is not exceeded.

Still referring to FIG. 3, upon receiving the initial TVM information request message 310, the Node-B schedules one or more EU data transmissions between the WTRU 105 and the Node-B via an EU data scheduling message 315. In response to receiving the EU data scheduling message 315, the WTRU 105 sends one or more EU data transmissions 320 allowed by the EU data scheduling message 315. If the EU transmissions allowed by the EU data scheduling message 315 are sufficient to transmit all of the EU data buffered in the WTRU 105, all of the EU data stored in the buffer 120 of the WTRU 105 is sent to the Node-B. No additional TVM reporting is necessary since the WTRU 105 is aware that there is no additional EU data to transmit to the Node-B 110.

Data associated with priority class or logical channels/MAC-d flows associated with TVMs may be stored in the Node-B 110 to make more precise channel allocations and more efficient use of radio resources. The Node-B 110 utilizes the TVMs and associated priorities to establish subsequent EU data scheduling with greater accuracy due to the additional TVM detail provided by the WTRU 105.

Figure 4:
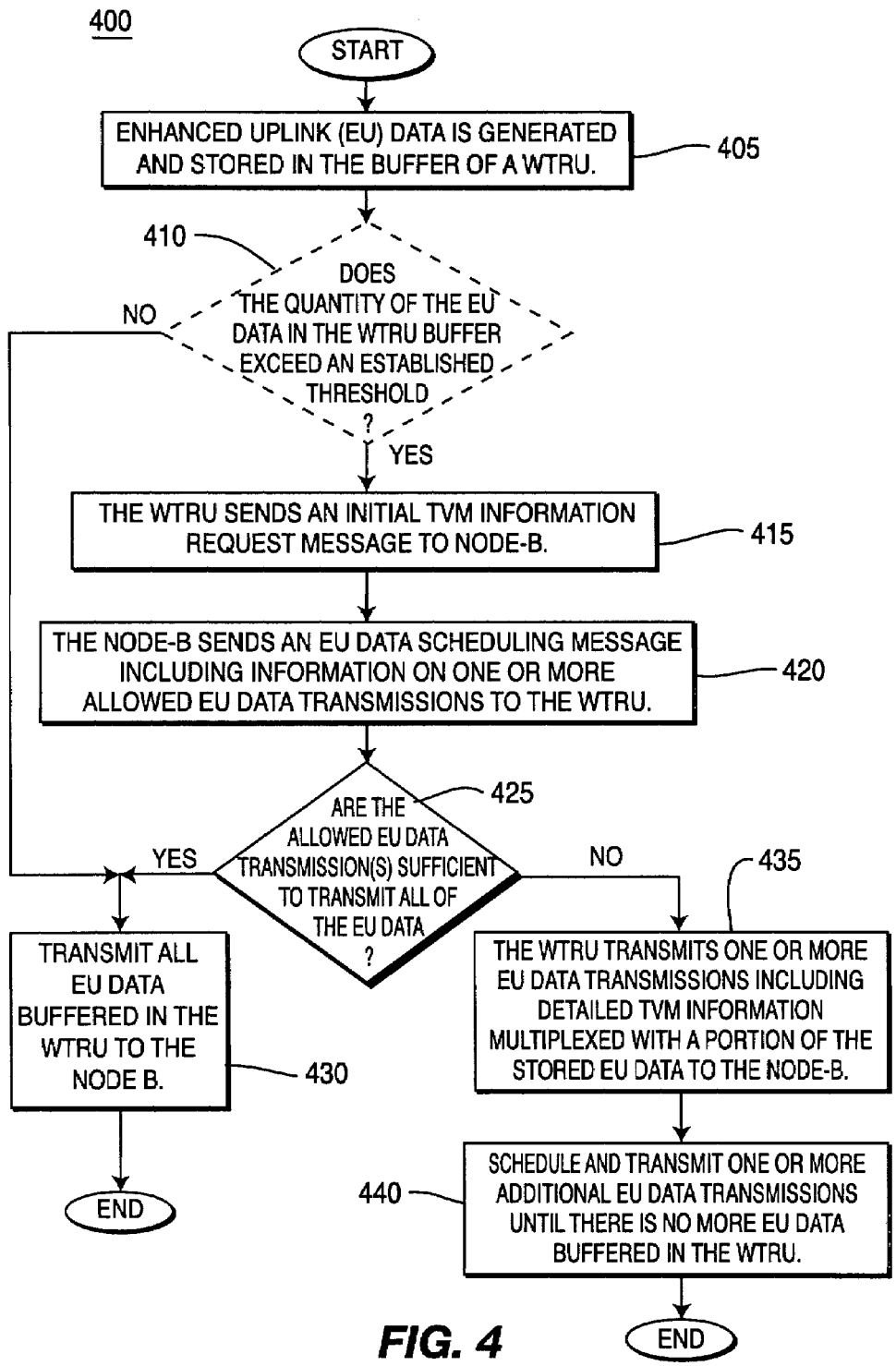
FIG. 4 is a flowchart of a process including method steps for implementing the reporting of TVMs in accordance with the present invention.

FIG. 4 is a flowchart of a process 400 including method steps for transferring user data from the WTRU 105 to the Node-B 110 in accordance with the present invention. In step 405, EU data is generated and stored in the buffer 120 of the WTRU 105. In optional step 410, a determination is made as to whether or not the quantity of EU data stored in the buffer 120 of the WTRU 105 exceeds an established EU data buffer threshold. When the quantity of the stored EU data in the buffer 120 of the WTRU 105 does not exceed the established threshold, EU transmissions are allowed without Node-B scheduling, and all of the stored EU data is transmitted to the Node-B 110 (step 430). If the quantity of the stored EU data exceeds the established threshold, the WTRU 105 sends an initial TVM information request message to the Node-B 110 indicating that the WTRU 105 has EU data to send to the Node-B 110 (step 415).

It should be noted that the established EU data buffer threshold may be set to zero. In this case, the storage of any amount of EU data in the buffer 120 of the WTRU 105 will always trigger the transmission of an initial TVM information request message 210.

Still referring to FIG. 4, in step 420, the Node-B 110 sends an EU data scheduling message, including information on one or more allowed EU data transmissions, to the WTRU 105 to schedule transmission of the EU data buffered in the WTRU 105 to the Node-B 110. In step 425, the WTRU 105 determines if the allowed EU data transmissions are sufficient to transmit all of the buffered EU data. If the EU data transmissions allowed by the current scheduling information are sufficient to support transmission of all of the EU data stored in the buffer 120, all of the EU data buffered in the WTRU 105 is transmitted to the Node-B 110 in the allowed EU data transmissions (step 430).

If the EU data transmissions allowed by the current scheduling information are not sufficient to transmit all of the EU data buffered in the WTRU 105, the WTRU 105 transmits one or more EU data transmissions including detailed TVM information multiplexed with a portion of the stored EU data to the Node-B 110 (step 435). In step 440, the Node-B 110 schedules and transmits one or more additional EU data transmissions until there is no more EU data buffered in the WTRU 105.

While this invention has been particularly shown and described with reference to preferred embodiments, it will be understood by those skilled in the art that various changes in form and details may be made therein without departing from the scope of the invention described hereinabove.

What is claimed is:

1. A method for use by a wireless transmit/receive unit (WTRU) for uplink transmission, the method comprising:

the WTRU transmitting a message to a Node-B, wherein the message is selected from at least a first type, a second type, and a third type;

wherein on a condition that the WTRU does not have capacity for the second type or the third type, the message is the first type indicating that the WTRU has uplink buffered data to transmit;

wherein on a condition that the WTRU has capacity for the second type message, the message is the second type comprising a plurality of indications, wherein each indication indicates an amount of uplink buffered data associated with at least one logical channel, wherein each logical channel is associated with a priority;

wherein on a condition that the message is not the first type or the second type, the message is the third type having less information than the second type and more information than the first type;

the WTRU receiving, in response to the message, information that indicates a grant of an uplink data transmission; and the WTRU transmitting uplink data over an uplink channel based on the received information.

2. The method of claim 1 wherein the message includes an indication of a total amount of uplink buffered data.

3. The method of claim 1 wherein the message includes an indication of an amount of uplink buffered data for a plurality of logical channels.

4. The method of claim 1 wherein the uplink data is transmitted over a plurality of physical channels.

5. The method of claim 1 wherein the message is multiplexed with uplink data.

6. The method of claim 5 wherein the message is multiplexed with uplink data at a medium access control (MAC) layer.

7. A wireless transmit/receive unit (WTRU) comprising:

circuitry configured to transmit a message to a Node-B, wherein the message is selected from at least a first type, a second type, and a third type;

wherein on a condition that the WTRU does not have capacity for the second type or the third type, the message is the first type indicating that the WTRU has uplink buffered data to transmit;

wherein on a condition that the WTRU has capacity for the second type message, the message is the second type comprising a plurality of indications, wherein each indication indicates an amount of uplink buffered data associated with at least one logical channel, wherein each logical channel is associated with a priority;

wherein on a condition that the message is not the first type or the second type, the message is the third type having less information than the second type and more information than the first type;

circuitry configured to receive, in response to the message, information that indicates a grant of an uplink data transmission; and circuitry configured to transmit uplink data over an uplink channel based on the received information.

8. The WTRU of claim 7 wherein the message includes an indication of a total amount of uplink buffered data.

9. The WTRU of claim 7 wherein the message includes an indication of an amount of uplink buffered data for all logical channels.

10. The WTRU of claim 7 wherein the uplink data is transmitted over a plurality of physical channels.

11. The WTRU of claim 7 wherein the message is multiplexed with uplink data.

12. The WTRU of claim 11 wherein the message is multiplexed with uplink data at a medium access control (MAC) layer.

* * * * *

UNITED STATES PATENT AND TRADEMARK OFFICE
CERTIFICATE OF CORRECTION

PATENT NO. : 8,040,834 B2
APPLICATION NO. : 10/953375
DATED : October 18, 2011
INVENTOR(S) : Zhang et al.

It is certified that error appears in the above-identified patent and that said Letters Patent is hereby corrected as shown below:

ON THE TITLE PAGE

Item (54), and Col. 1, Line 4, after "SUPPORT", delete "ENHANCED".

Item (56) OTHER PUBLICATIONS, page 1, right column, after "3GPP2", delete "C.2003-C" and insert --C.S003-C--.

Item (56) "OTHER PUBLICATIONS", page 2, right column, after "Nokia,", delete ""Uplink Enhancements for Dedicated Transport Channels,"" and insert --"Issues to be studied for Enhanced Uplink DCH"--.

Item (56) "OTHER PUBLICATIONS", page 2, right column, after the line "TSG-RAN WG 1 #34, R1-031056 (Oct. 2003)", delete "3GPP, "3rd Generation Partnership Project; Technical Specification Group Radio Access Network, Medium."

IN THE CLAIMS

At Claim 9, column 6, line 28, after "buffered data for", delete "all" and insert --a plurality of--.

Signed and Sealed this
Thirty-first Day of July, 2012

David J. Kappos
*Director of the United States Patent and Trademark Office*